(12) United States Patent
Song

(10) Patent No.: US 9,631,336 B2
(45) Date of Patent: Apr. 25, 2017

(54) SCREW ANCHOR PILE FOR EARTH REINFORCEMENT AND MANUFACTURING METHOD FOR THE SAME

(71) Applicant: EXT CO., LTD., Seoul (KR)

(72) Inventor: Kiyong Song, Seoul (KR)

(73) Assignee: EXT CO., LTD., Seoul (KR)

( * ) Notice: Subject to any disclaimer, the term of this patent is extended or adjusted under 35 U.S.C. 154(b) by 19 days.

(21) Appl. No.: 14/708,280

(22) Filed: May 10, 2015

(65) Prior Publication Data
US 2015/0345098 A1    Dec. 3, 2015

(30) Foreign Application Priority Data

May 29, 2014    (KR) .................... 10-2014-0064843
Jan. 30, 2015   (KR) .................... 10-2015-0014739

(51) Int. Cl.
| | |
|---|---|
| *E02D 5/56* | (2006.01) |
| *B23K 31/02* | (2006.01) |
| *E02D 13/02* | (2006.01) |
| *E02D 7/22* | (2006.01) |
| *B23K 101/08* | (2006.01) |
| *B23K 101/20* | (2006.01) |

(52) U.S. Cl.
CPC .............. *E02D 5/56* (2013.01); *B23K 31/02* (2013.01); *E02D 7/22* (2013.01); *E02D 13/02* (2013.01); *B23K 2201/08* (2013.01); *B23K 2201/20* (2013.01)

(58) Field of Classification Search
CPC .. E02D 5/56; E02D 7/22; E02D 13/02; B23K 31/02

USPC ................ 405/252.1, 253; 228/164
See application file for complete search history.

(56) References Cited

U.S. PATENT DOCUMENTS

2012/0087741 A1*  4/2012  Desmeules ............. E02D 5/285
                                                         405/251

FOREIGN PATENT DOCUMENTS

| KR | 10-2012-0126702 A | 11/2012 |
| KR | 10-1416864 B1 | 7/2014 |

* cited by examiner

*Primary Examiner* — Tara M. Pinnock
(74) *Attorney, Agent, or Firm* — Novick, Kim & Lee, PLLC; Jae Youn Kim

(57) ABSTRACT

The present invention relates to a screw pile for reinforcing the ground, and in particular, a pile for reinforcing the ground which can dig the ground. The screw pile includes: a bar-shaped body with a pile hole that is a passage of air and grouting solution; a screw that is formed spirally and integrally around the body; one or more grouting holes formed around the body so that grouting solution can be sprayed; a tip expanding-reinforcing plate that has a plate shape, is coupled to one end of the body on its top, and has an air discharge hole formed through the top and the bottom in the same line as the pile hole; and a excavation bit that has one end coupled to a side of the bottom of the tip expanding-reinforcing plate and the other end with a blade, in which when the bit 500 and the screw form a hole in the ground by rotation, the tip expanding-reinforcing plate moves to the bottom of the hole and performs grounding, increasing a tip support force.

12 Claims, 12 Drawing Sheets

SCREW ANCHOR PILE FOR EARTH REINFORCEMENT AND MANUFACTURING METHOD FOR THE SAME

CROSS-REFERENCE TO RELATED APPLICATION

This application claims priority to and the benefit of Korean Patent Application No. 10-2014-0064843, filed on May 29, 2014, and the benefit of Korean Patent Application No. 10-2015-0014739, filed on Jan. 30, 2015, the disclosure of which is incorporated herein by reference in its entirety.

BACKGROUND OF THE INVENTION

Field of the Invention

The present invention relates to a screw pile for reinforcing the ground and a method of manufacturing the same, and more particularly, to a screw pile for digging and reinforcing the ground and a method of manufacturing the screw pile.

Description of the Related Art

In general, when high-rise buildings or reinforced concrete structures are constructed, concrete or steel piles are driven into the ground to make a firm base upon which the foundation will be constructed.

A driving type and a digging type have been proposed to install piles. The driving type can be divided into two types; first, hitting a pile down into the ground by lifting a hammer, which is a weight, and then dropping it down, using a winding rope on a leader vertically mounted on a crowler unit and second, hitting a pile down into the ground by lifting a hammer and then dropping it down using compressed air from a compressor. The digging type is a method of forming a pile hole by digging the ground using a screw pile that is rotated on a pile joint, and then taking the screw pile out of the pile hole by reversing it, and inserting a pile into the pile hole.

However, since digging the ground with screw files is accompanied by large differences in time and workability according to the shapes of the screw piles, a need to find a shape which allows a screw pile to most effectively dig the ground has been constantly emerged. Thus, the applicant(s) has attempted to improve workability in Korean Patent No. 10-1416864. That is, Korean Patent No. 10-1416864 proposes a way of improving workability of digging in addition to reducing the time taken to dig the ground with a screw pile.

However, in Korean Patent No. 10-1416864 submitted by the applicant(s), two projections are directly combined with a rod, causing the smaller gap between the projections compared to the width of a screw. Accordingly, the screw comes in direct contact with the hard portions of the ground, which has not been cut off by the projections in digging, causing the screw to be broken. Further, according to Korean Patent No. 10-1416864, even though the patented method can possibly improve the workability of digging, it cannot secure a tip support force. The anchoring force for an embedded pile is the sum of the tip support force at the end of the pile and a friction force around the pile. Since the existing methods cannon secure the tip support force, a greater amount of piles is required to ensure the support force in design.

CITATION LIST

Patent Literature

Patent Literature 1: Korean Patent No. 10-1416864
Patent Literature 2: Korean Patent Application No. 10-2012-0126702

SUMMARY OF THE INVENTION

The present invention has been made in an effort to provide a screw pile and its manufacturing method that can reduce the time taken to digging the ground and embedding a pile by simultaneously digging the ground and constructing an embedded pile that can secure a tip support force by preventing itself from being damaged by avoiding contact with the ground first when digging. This will improve workability and economic efficiency.

In order to achieve this objective, a screw pile for reinforcing the ground which can dig the ground includes: a bar-shaped body with a pile hole that is a passage of air and grouting solution; a screw that is formed spirally and integrally around the body; one or more grouting holes located around the body so that grouting solution can be sprayed; a tip expanding-reinforcing plate that has a plate shape, is coupled to one end of the body on its top, and has an air discharge hole formed through the top and the bottom in the same line as the pile hole; and the excavation bit that has one end coupled to a side of the bottom of the tip expanding-reinforcing plate and the other end with a blade, where the bit and the screw form a hole in the ground by rotation and the tip expanding-reinforcing plate moves to the bottom of the hole and performs grounding, thereby increasing a tip support force.

Further, a screw pile for reinforcing the ground includes: a rod having an internal hole and grouting holes; a screw that is spirally formed in the longitudinal direction around the rod; and a head assembly that is composed of a head and bits coupled to the left and right sides of the head and is coupled to the tip of the rod, in which the width of the screw and the widths of the left and right sides of the head assembly are the same.

Further, a method of manufacturing a screw pile for reinforcing the ground includes: manufacturing a rod and a screw; manufacturing a head assembly used to be combined with the rod; and combining the rod with the head, in which the manufacturing of a head assembly includes: forming an integrated head; forming a discharge hole through the center of the head; forming a coupling groove for coupling the rod on a side of the head; and welding plate-shaped bits to the left and right sides of the head, respectively.

DETAILED DESCRIPTION OF THE PREFERRED EMBODIMENTS

Hereinafter, screw piles for reinforcing the ground and a method of manufacturing the screw piles according to the present invention will be described in detail with reference to the accompanying drawings.

Figure 1:
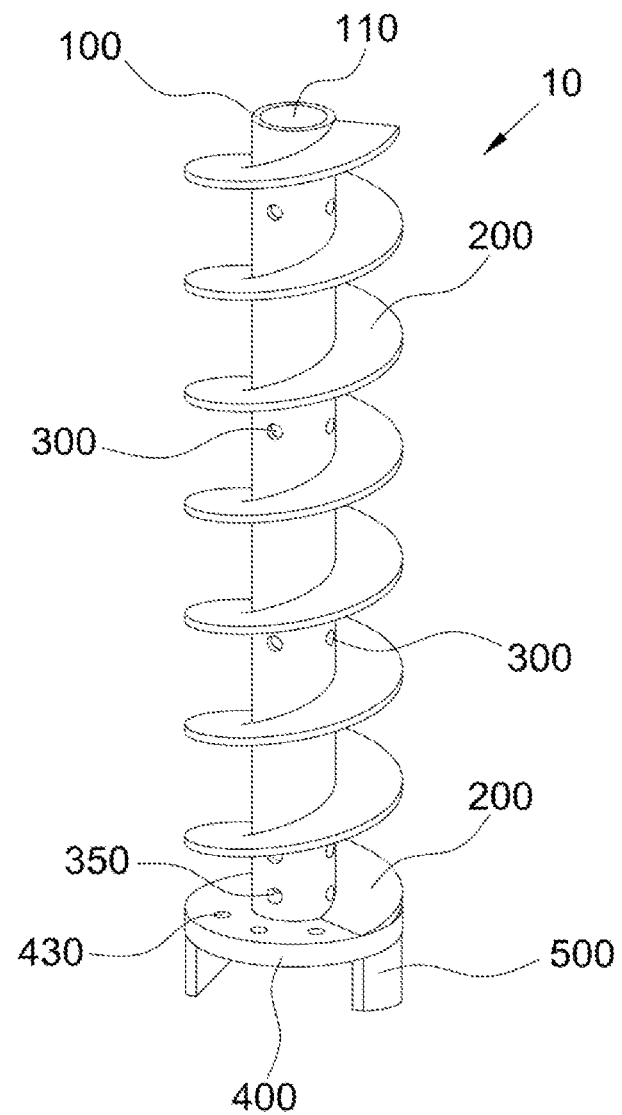
FIG. 1 is a perspective view showing a screw pile according to an embodiment of the present invention.
Figure 2:
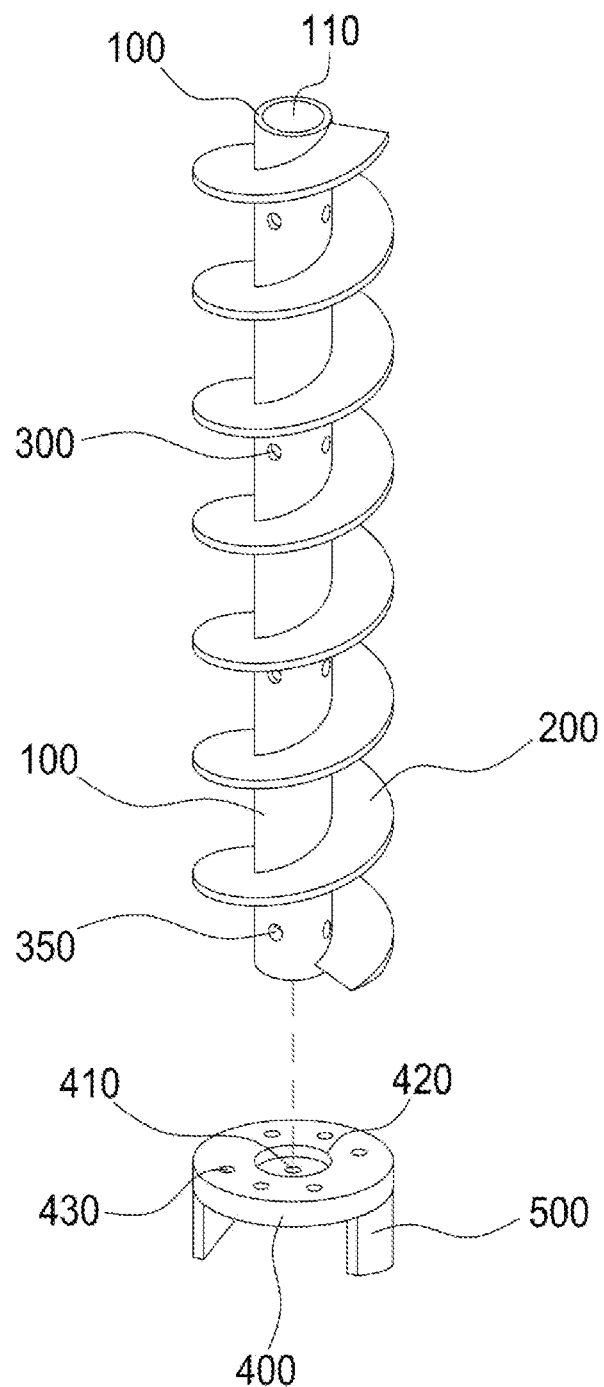
FIG. 2 is an exploded perspective view of FIG. 1.

FIG. 1 is a perspective view showing a screw pile according to an embodiment of the present invention and FIG. 2 is an exploded perspective view of FIG. 1.

Figure 3:
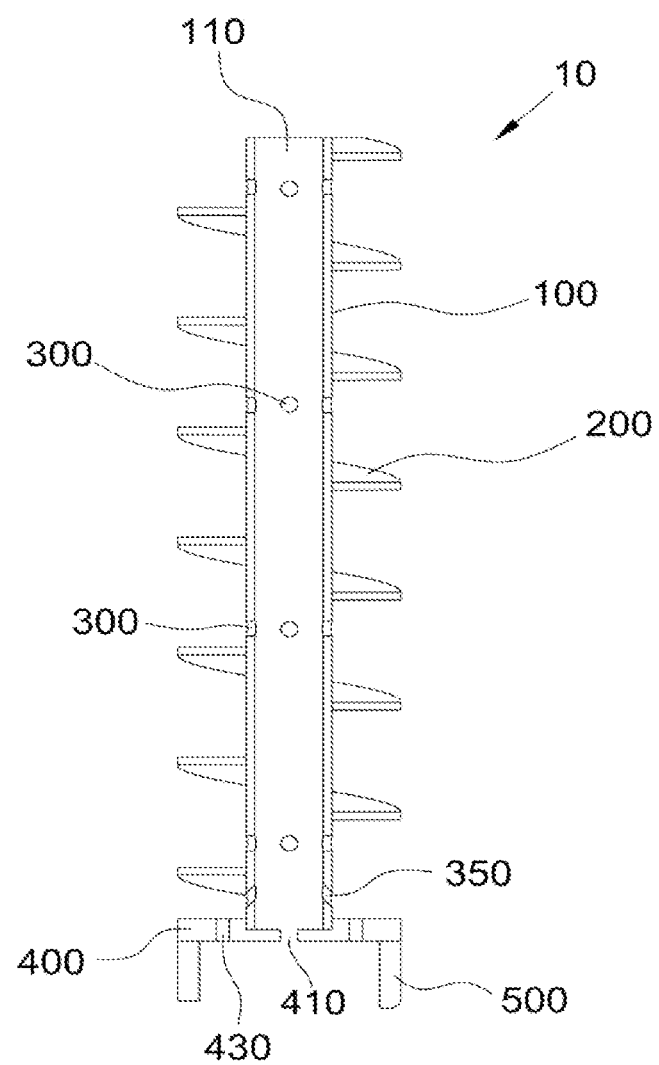
FIG. 3 is a cross-sectional view of FIG. 1.
Figure 4:
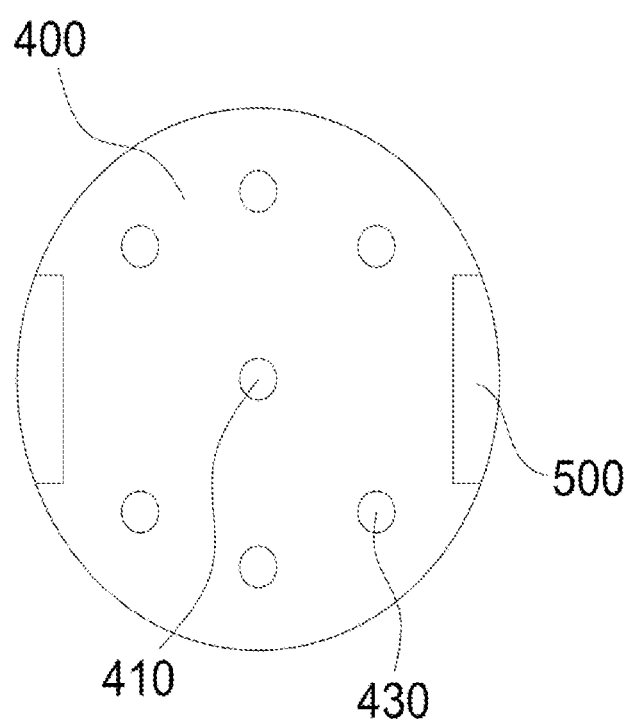
FIG. 4 is a bottom view of FIG. 1.

FIG. 3 is a cross-sectional view of FIG. 1 and FIG. 4 is a bottom view of FIG. 1.

Figure 5:
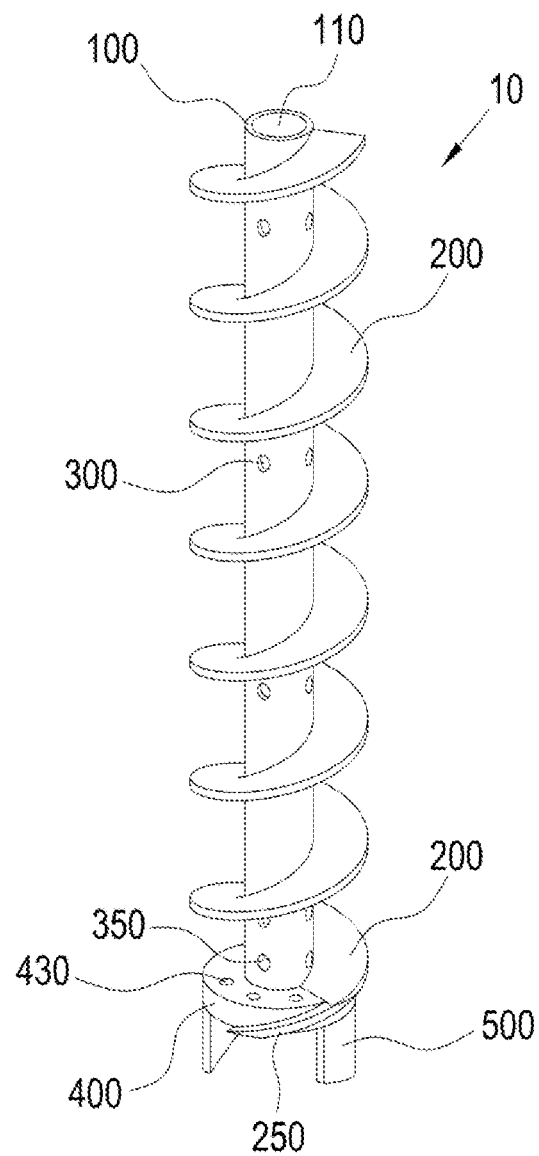
FIG. 5 is a perspective view showing a screw pile according to a second embodiment of the present invention.

FIG. 5 is a perspective view showing a screw pile according to a second embodiment of the present invention.

The present invention relates to a screw pile for reinforcing the ground, and in particular, a pile for reinforcing the ground which can dig the ground. The screw pile includes: a bar-shaped body 100 with a pile hole 110 that is a passage of air and grouting solution; a screw 200 that is formed spirally and integrally around the body 100; one or more grouting holes 300 formed around the body 100 so that grouting solution can be sprayed; a tip expanding-reinforcing plate 400 that has a plate shape, is coupled to one end of the body 100 on its top, and has an air discharge hole 410 formed through the top and the bottom in the same line as the pile hole 110; and the excavation bit 500 that has one end coupled to a side of the bottom of the tip expanding-reinforcing plate 400 and the other end with a blade, so when the bit 500 and the screw 200 form a hole in the ground by rotating, the tip expanding-reinforcing plate 400 moves to the bottom of the hole and performs grounding, thereby increasing a tip support force.

The present invention relates to a screw pile for reinforcing the ground which is composed of the body 100, the screw 200, the grouting holes 300, the tip expanding-reinforcing plate 400, and the bit 500, which can reduce the time and cost of installing piles for supporting the load of a structure.

In general, when high-rise buildings or reinforced concrete structures are constructed, concrete or steel piles are driven into the ground to make the base firm during the foundation construction. The pile installation process is a also very important step when constructing building and structure.

A driving type and a digging type have been proposed for the pile installation. As to the former, the driving type, it can be divided into two types. The first one is hitting a pile down into the ground by lifting a hammer, which is a weight, and then dropping it down, using a winding rope on a leader vertically mounted on a crowler unit and the second one is hitting a pile down into the ground by lifting a hammer and then dropping it down using compressed air from a compressor. As to the latter, the digging type, it is a method of forming a pile hole by digging the ground using a screw pile rotated on a pile joint, and then taking the screw pile out of the pile hole by reversing it and finally, inserting a pile into the pile hole.

However, digging the ground with screw files is accompanied by large differences in time and workability for digging the ground in accordance with the shapes of the screw piles, so there has been a need to find a shape which allows a screw pile to dig the ground most effectively and the applicant(s) has attempted to improve workability in Korean Patent No. 10-1416864. That is, Korean Patent No. 10-1416864 proposes a way of improving workability of digging in addition to the reducing the time taken to dig the ground with a screw pile.

However, according to Korean Patent No. 10-1416864 submitted by the applicant(s), even though the patented method can possibly improve the workability of digging, it cannot secure a tip support force. The anchoring force for an embedded pile is the sum of the tip support force at the end of the pile and a friction force around the pile. Since the existing methods cannot secure the tip support force, a greater amount of piles is required to ensure the support force in design.

The present invention has been made in an effort to provide a screw pile that can secure a tip support force and be installed by simultaneously digging the ground and embedding the pile, therefore improving workability and economical efficiency.

In short, since the tip expanding-reinforcing plate is combined with the pile in the present invention, the anchoring force for a pile can be increased by the tip support force of the pile. According to the present invention, it is possible to reduce the number of piles or the length of a pile in order to secure a design support force, which can shorten the construction period and reduce the cost of construction. Further, according to the present invention, simultaneously digging the ground and embedding a pile, results in additional time saving over the traditional method of digging the ground and then embedding a pile.

The body 100 is a bar-shaped part with a pile hole 110 that is a passage of air and grouting solution. The body 100 has the pile hole 110 that is elongated longitudinally through the center and provides a passage for fluid to make digging easy by spraying fluid, such as water or air, when digging the ground. When air is injected into the ground through the pile hole 110, the ground weakens and digging becomes easier. The soil is rapidly sent to the screw 200, to be described below, and is smoothly discharged. The pile hole 110 is used to inject air or fluid when digging the ground and installing the pile and then is used to inject grouting solution while grouting.

The present invention may further include one or more bodies 100 with grouting holes 300 that are coupled to the other end of the body 100, depending on the digging depth. That is, multiple bodies 100 may be combined, depending on the digging depth, in order to dig the ground to a desired depth required by the design.

Various materials, including a steel pipe, can be used for the body 100, as long as they satisfy the required strength.

The screw 200 is integrally and spirally formed around the body 100. The screw 200 may be formed around the entire body 100 or may be formed at a predetermined length from one end. The screw 200 helps the screw pile 10 cut into the ground by rotation so that the screw pile 10 can be easily inserted into the ground. Further, the screw 200 turns into a passage for soil that is cut off by digging to be rapidly discharged out. The screw 200 may be formed around the body 100 in the longitudinal direction of the body 100, with various pitches and diameters in accordance with the features of the ground. For example, in the screw pile 10, the pitch P of the screw 200 may be 2.3~2.5 times larger than the diameter d of the body 100, the diameter D of the screw 200 may be 1.5~2.0 times larger than the diameter d of the body 100, and the ratio of the pitch P and the diameter D of the screw 200 may be 1.2~1.5. Herein, the diameter d of the body 100 means the outer diameter of the body 100, the pitch P of the screw 200 means the gap between the blades of the screw 200, and the diameter D of the screw 200 means the outer diameter of the circle constructed by the screw 200.

Various materials may be used for the screw 200, as long as they satisfy the required strength and the same material as the body 100 may be used for the convenience of manufacturing.

One or more grouting holes 300 are formed through the body 100 so that grouting solution can be sprayed. The grouting holes 300 may be formed opposite to each other around the body 100, and for example, two or four grouting holes 300 may be formed opposite to each other. When two grouting holes 300 are formed opposite to each other through the side of the body 100, it is possible to discharge more soil flowing into the body 100 through an open end of the body 100. In addition, when four grouting holes 300 are formed opposite to each other through the side of the body 100, it is possible to reduce the time it takes to drive the screw pile 10 at the same depth into the ground. The grouting holes 300 may be arranged with regular intervals in the longitudinal direction of the body 100 and the gap may be variously changed in accordance with the features of the ground to be dug. For example, the grouting holes 300 may be formed with a gap of 1 m. It is effective to arrange the grouting holes 300 alternately in the longitudinal direction of the body 100 so that grouting solution can uniformly permeate into a hole bored in the ground.

The tip expanding-reinforcing plate 400 has a plate shape, and it is coupled to an end of the body 100 on the top, and has the air discharge hole 410 formed through the top and the bottom in the same line as the pile hole 110. The diameter of the tip expanding-reinforcing plate 400 should be smaller than the diameter of the assembly of the body 100 and the screw 200. Also, the tip expanding-reinforcing plate 400 can easily secure a tip support force by being seated on the body of a bored hole. That is, the tip expanding-reinforcing plate 400 can provide a tip support force corresponding to the cross-sectional area of the tip expanding-reinforcing plate 400 by being supported on the bottom of a bored hole, thus, it can resist a large compression load. Accordingly, a tip support force is secured by the tip expanding-reinforcing plate 400 installed in the ground, so a friction force against required tensile force and compression force are reduced. For example, when the pile to be installed is a micro pile, the installation length to be secured may be small, so it is possible to reduce the digging cost and the grouting solution injection cost in accordance with the length of the micro pile, along with the shortened construction period. In another example, if a pile to be installed is a simple one, the tip support force can be increased, reducing the number of piles to be installed. The tip expanding-reinforcing plate 400 may be formed in various shapes, as long as it can increase the tip support force, and for example, when the body 100 is formed in a circular bar shape for the convenience of installation, the tip expanding-reinforcing plate 400 may also be formed in a circular plate shape.

The air discharge hole 410 is a hole through which air is discharged out so that soil cut off by the excavation bit can be sent outside. The air discharge hole 410 has an appropriate size so that the soil cut off in digging can be sent out with the help of the injected air, and it may have a diameter, for example, of 10~30 mm.

The tip expanding-reinforcing plate 400 may have a coupling groove 420 on the top with the air discharge hole 410 to fit to the size of the end of the body 100, so the end of the body 100 can be inserted in the coupling groove 420. When the tip expanding-reinforcing plate 400 and the body 100 may be combined by applying various methods such as welding, and for easy coupling, the coupling groove 420 may be formed at a side of the tip expanding-reinforcing plate 400. The coupling groove 420 has a circular cross-sectional area on the air discharge hole 410 and is larger than the outer diameter of the body 100 so that the body 100 can be easily inserted. When threads are formed around the inner side of the coupling groove 420 and threads are formed at an end of the body, the tip expanding-reinforcing plate 400 and the body 100 can be combined by the threads. When a coupling groove is formed at the tip expanding-reinforcing plate 400, it is possible to produce the screw pile 10 whenever it is necessary, by manufacturing the tip expanding-reinforcing plate 400 in large quantities and by combining the plate with a body.

Also, the tip expanding-reinforcing plate 400 has multiple soil holes 430 formed through the top and the bottom and the soil holes 430 allow soil cut off by the bit 500 to be discharged outside. The soil holes 430 may be formed with various diameters around the edge of the tip expanding-reinforcing plate 400 so that soil cut off from digging can be easily discharged outside. For example, their diameters may range 10~40 mm. The air discharge holes 430 may be formed at four to eight positions around the edge of the tip expanding-reinforcing plate 400.

In the tip expanding-reinforcing plate 400, a portion of the circular plate may be cut perpendicular to the longitudinal direction of the body 100 and the cut portions are twisted to be spaced at a predetermined distance. In this case, the air discharge hole 410 is formed as large as the diameter of the body 100, so that the tip expanding-reinforcing plate 400 can be easily combined with the body 100 and when digging the ground, the tip expanding-reinforcing plate 400 can help dig the ground easily by functioning like the screw 200.

According to the present invention, air spray holes 350 may be formed around the body 100, close to the tip expanding-reinforcing plate 400. The air spray holes 350 are holes through which air is sprayed to discharge the soil cut off from digging that remain on the top of the tip expanding-reinforcing plate 400 without being discharged outside. The air spray holes 350 may be formed with various diameters and in various directions. For example, the air holes 350 may be declined down inward from the outside so that the soil on the top of the tip expanding-reinforcing plate 400 can be easily discharged.

Figure 6:
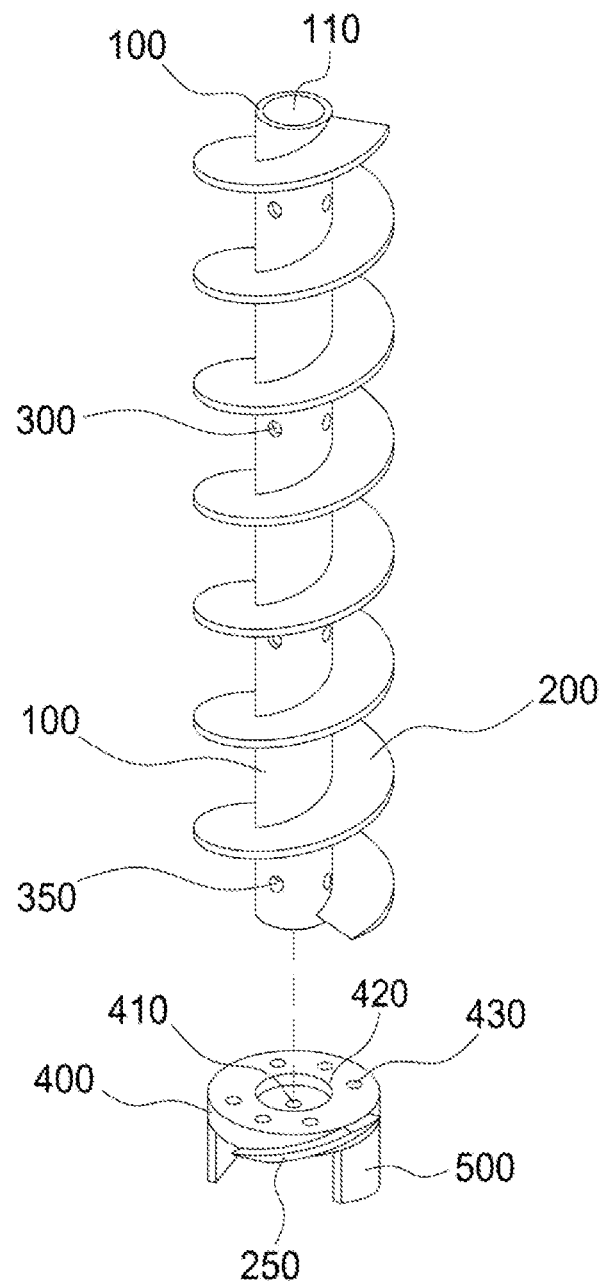
FIG. 6 is a perspective view showing a screw pile according to a third embodiment of the present invention.
Figure 7:
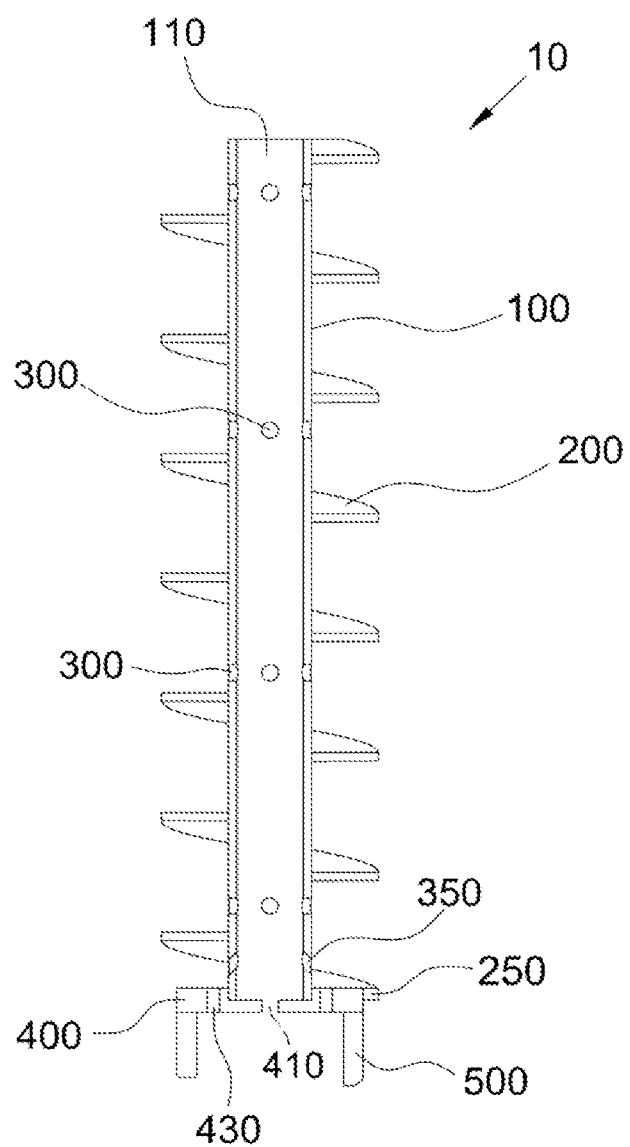
FIG. 7 is an exploded perspective view of FIG. 6.

FIG. 6 is a perspective view showing a screw pile according to a third embodiment of the present invention and FIG. 7 is an exploded perspective view of FIG. 6.

Figure 8:
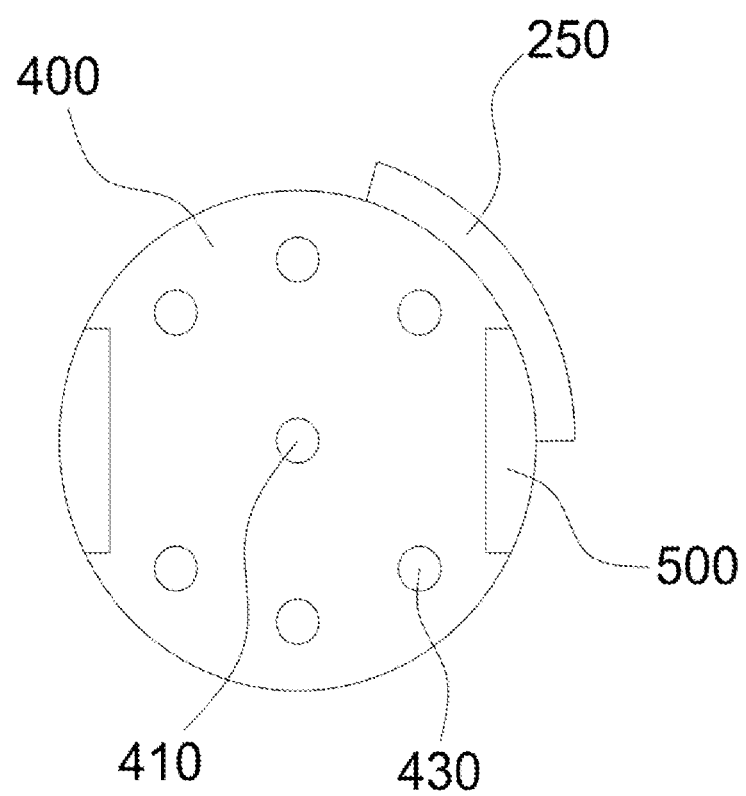
FIG. 8 is a cross-sectional view of FIG. 6.
Figure 9:
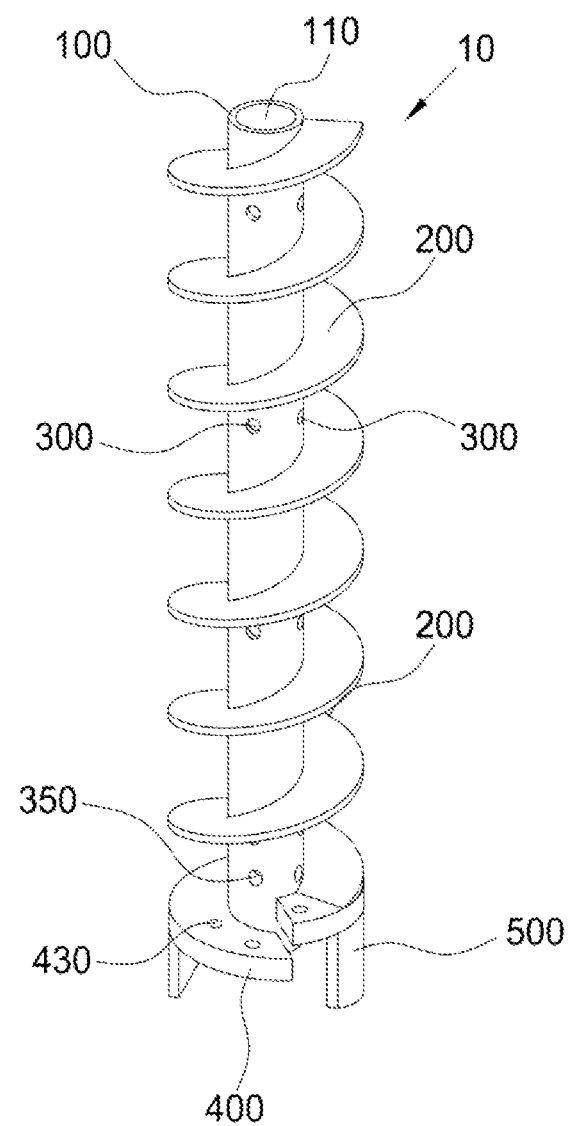
FIG. 9 is a bottom view of FIG. 6.

FIG. 8 is a cross-sectional view of FIG. 6 and FIG. 9 is a bottom view of FIG. 6.

According to the present invention, a sub-screw may be additionally coupled to the outer side of the tip expanding-reinforcing plate 400 so that the screw pile can be easily inserted into the ground. That is, in detail, the tip expanding-reinforcing plate 400 may further include a sub-screw 250 integrally and spirally formed around the tip expanding-reinforcing plate 400. Multiple sub-screws 250 may be provided so that the screw pile can be easily inserted into the ground and may have a shape corresponding to the screw 200. For example, the sub-screw 250 may be spirally formed around the tip expanding-reinforcing plate 400 so that its one end is engaged with one end of the screw 200.

Various materials can be used for making the sub-screw 250, as long as they satisfy required strength and for the convenience of manufacturing, a material such as the tip expanding-reinforcing plate 400 can be used.

Figure 10:
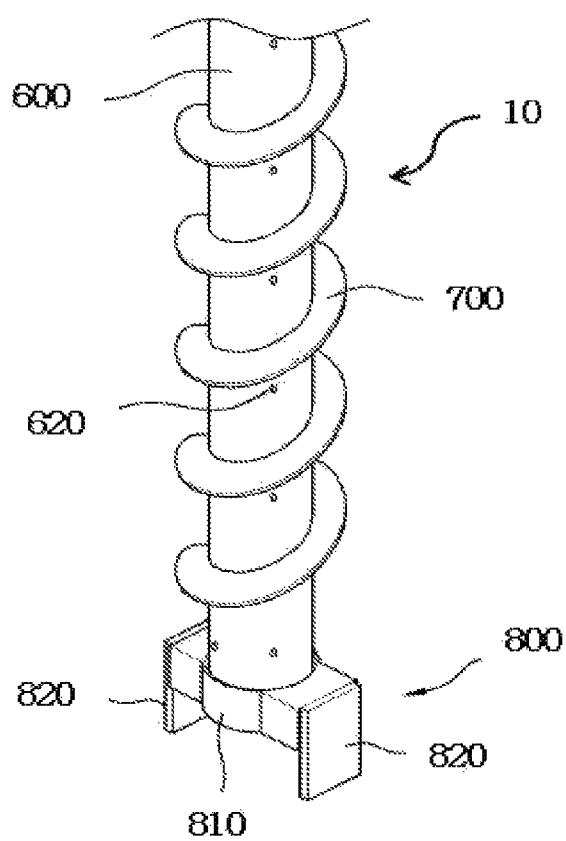
FIG. 10 is a perspective view showing a screw pile according to a fourth embodiment of the present invention.
Figure 11:
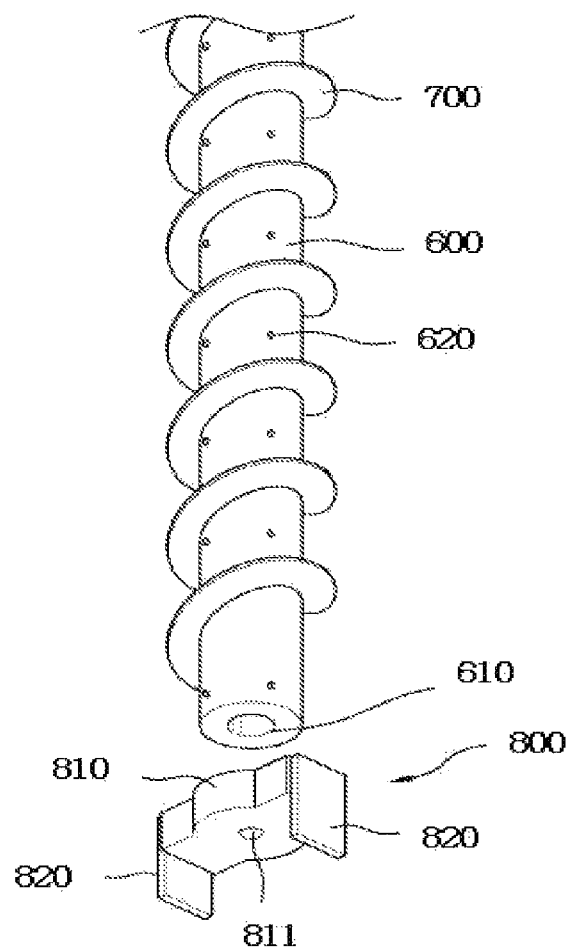
FIG. 11 is an exploded perspective view of FIG. 10.
Figure 12:
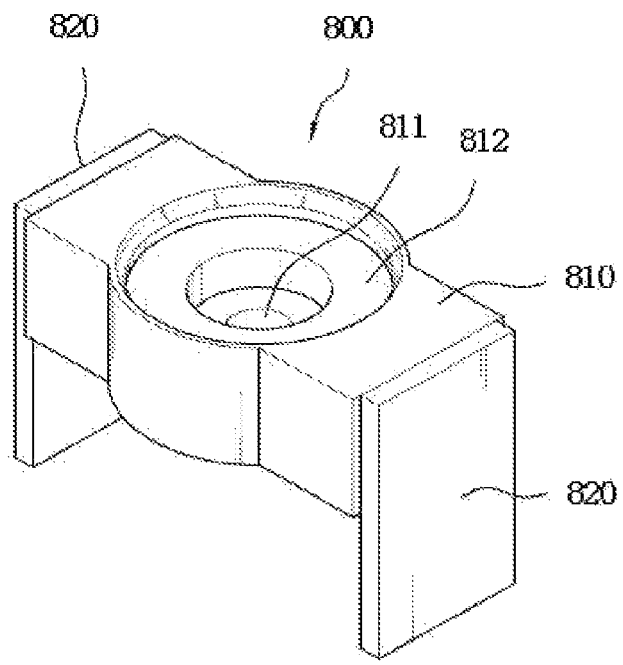
FIG. 12 is a perspective view of the head assembly shown in FIG. 10.

FIG. 10 is a perspective view showing a screw pile according to a fourth embodiment of the present invention and FIG. 11 is an exploded perspective view of FIG. 10. FIG. 12 is a perspective view of the head assembly shown in FIG. 10.

Figure 13:
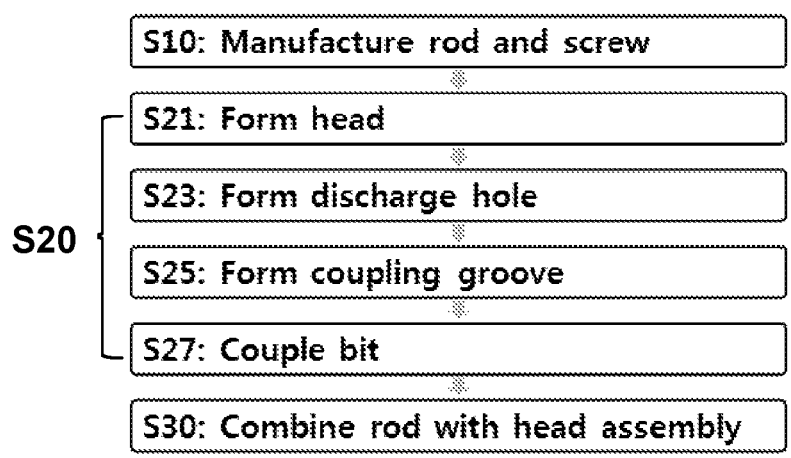
FIG. 13 is a flowchart illustrating a method of manufacturing the screw pile shown in FIG. 10.

FIG. 13 is a flowchart illustrating a method of manufacturing the screw pile shown in FIG. 10.

Referring to FIGS. 10 and 11, a screw pile 10 according to another embodiment of the present invention includes: a rod 600 having an internal hole 610 and grouting holes 620; a screw 700 that is spirally formed in the longitudinal direction around the rod 600; and a head assembly 800 that is coupled to the tip of the rod 600 and is composed of a head 810; and bits 820 coupled to the left and right sides of the head 810.

According to the present invention, the screw pile for reinforcing the ground is composed of the rod 600, the screw 700, and the head assembly 800 and can reduce the time and cost for the installation of piles for supporting the load of a structure, similar to the screw pile for reinforcing the ground described above. In short, according to the present invention, it is possible to simultaneously perform digging the ground and embedding a pile, remarkably reducing the time taken to first dig the ground and then embed a pile.

The rod 600, a cylindrical part with the internal hole 610, has the grouting holes 620 around it. The rod 600 makes excavation easy by spraying fluid such as water or air through an end of the rod 600 when digging the ground.

When air is injected into the ground through the internal hole 610, the ground weakens and excavation can be performed more smoothly and soil cut off from excavation can be rapidly sent to the screw 700, thereby smoothly discharging the soil. The internal hole 610 is used as a passage for injecting fluid such as water or air when the ground is dug and a pile is installed, and it is also used as an injection passage for grouting solution in grouting.

Multiple grouting holes 620 may be formed around the rod 600, as shown in FIG. 2, and the arrangement of the grouting hole 620 may be variously changed in accordance with the features of the ground to be dug.

The screw 700 is formed spirally in the longitudinal direction around the rod 600 and operates with the rod 600. The size of a base depends on the rotational radius of the screw 700 and the width of the screw 700 is adjusted in accordance with a desired support force or the features of the ground to be dug.

FIG. 12 is a perspective view showing the head assembly according to the present invention and the head assembly includes: a head 810 having a discharge hole 811 formed through the bottom; and the bits 820 at the left and right sides of the head 810. The head assembly 800 is a part that is coupled to the tip of the rod 600, and comes in contact with the ground first and digging the ground when digging.

The head 810 is coupled to the tip of the rod 600 by welding, and as shown in FIG. 12, a coupling groove 812 may be formed on the side to be coupled to the rod 600. The edge of the coupling groove 821 may be tapered for easy coupling to the rod 600.

Further, a discharge hole 811 may be formed through the center of the head 810. When the rod 600 and the head assembly 800 are combined, the discharge hole 811 communicates with the internal hole 610 and is exposed through the bottom of the head 810. Through the discharge hole 811, fluid such as water or air is sprayed in digging of the ground of installation of a pile, and grouting solution is sprayed in grouting.

The bits 820 are coupled to the head 810 so that the screw pile can be easily cut into the ground by substantially breaking the ground. The bits 820 are coupled to the left and right sides of the head, as shown in FIG. 12.

The head assembly 800 having this configuration has the same width as the screw 700. In the screw piles of the related art, there was a problem in that the head 800 is smaller in width than the screw 700, so the screw 700 easily breaks when digging the ground. However, according to the screw pile 10 of the present invention, the screw 700 is the same in width as the head assembly 800, so the screw 700 does not break when digging the ground.

There may be a little difference between the widths of the screw 700 and the head assembly 800 due to a tolerance in manufacturing but such a difference range should be considered to be included in the same range.

Describing the head assembly 800 according to the present invention through embodiments, as shown in FIG. 12, the bits 820 can be coupled to the left and right sides of the integrally formed head 810.

It is possible to make the widths of the screw 700 and the head assembly 800 the same by putting a base material for the head 810 to the tip of the rod 600 and coupling to the bits 820 to the base material, instead of using the integrally formed head 810.

The widths of the screw 700 and the head assembly 800 are made the same by combining the head 810, which is large enough to cover the tip of the rod 600, with the rod 600, and then by additionally putting a base material to the head 810 and coupling the bits 820.

However, both cases described above have the disadvantage of having an increased number of times of welding in order to make the widths of the screw 700 and the head assembly 800 the same and to couple the bits 820. For example, welding should be performed four times in order to couple the bits 820 to the left and right sides of the tip of the rod 600. However, when the integrally formed head 810 is used, welding is required only two times. This can reduce the number of times of welding. As a result, the manufacturing cost of the entire screw pile can be reduced.

Further, the head assembly 800 according to the present invention may be created by coupling plate-shaped bits to the left and right sides of a hexahedral head 810.

The bits 820 may be positioned on the left and right sides of the head 810 or at the left and right sides of the bottom of the head 810. The coupling area is larger when the bits 820 are coupled to the left and right sides of the head 810, as shown in FIG. 12, than when they are coupled to the left and right sides of the bottom of the head 810, leasing the increased coupling ability and stability.

Further, as shown in FIG. 12, the front and rear sides of the hexahedral head 810 may be curved along a circumferential extension line from the rod 600. Accordingly, it is possible to save the material for the head 810 and reduce the manufacturing cost.

Therefore, according to the screw pile 10 of the present invention, the screw 700 is the same in width as the head assembly 800, so the screw 700 does not break when digging the ground. Further, since the integrally formed head 810 is used, the manufacturing cost can be reduced.

FIG. 13 is a flowchart illustrating a method of manufacturing a screw pile according to the present invention. Referring to FIG. 13, a method of manufacturing the screw pile 10 according to the present invention includes: manufacturing the rod 600 and the screw 700 (S10); manufacturing the head assembly 800 to be combined with the rod 600 (S20); and combining the rod 600 with the head 800 (S30), in which the manufacturing of the head assembly 800 (S20) includes the following steps.

① Manufacturing the head 810 (S21): Manufacturing an integrated head 810 using a base material for the head 810. For example, the head 810 may be formed by machining a base material in a hexahedral shape.

② Forming the discharge hole 811 (S23): Forming the discharge hole 811 through the center of the head 810.

③ Forming the coupling groove 812 (S25): Forming the coupling groove 812 on a side of the head 810 for coupling the rod 600.

④ Coupling the bits 820 (S27): Welding the plate-shaped bits 820 to the left and right sides of the head 810.

The present invention has the following effects.

First, since the tip expanding-reinforcing plate is combined with the pile in the present invention, the anchoring force for a pile can be increased by the tip support force of the pile. That is, according to the present invention, it is possible to reduce the number of piles or the length of a pile in order to secure a design support force, which considerably shortens the construction period and reduces the construction cost.

Second, according to the present invention, it is possible to simultaneously dig the ground and embed a pile, reducing the time taken to dig the ground and embed a pile.

Third, according to the screw pile and the method of manufacturing the screw pile of the present invention, since the screw is the same in width as the head assembly, the screw is not damaged when digging the ground. Further, since the integrated head is used, it is possible to reduce the number of times of welding and reduce the manufacturing cost of the screw pile.

Although exemplary embodiments of a screw pile for reinforcing the ground according to the present invention and the manufacturing method of the screw pile were described above, the spirit, the configuration, and the operation of the present invention are not limited thereto and the scope of the present invention is not limited to the drawings or the description referring to the drawings. Moreover, the concept and embodiments of the present invention described above may be used as the base of changing or designing the present invention into other ways to achieve the same objects by those skilled in the art, and the equivalent modifications and the changes by those skilled in the art are included in the scope of the present invention described in claims and the present invention may be changed and modified in various ways without departing from the spirit or scope of the present invention described in claims.

What is claimed is:

1. A screw pile for reinforcing the ground, comprising:
   a bar-shaped body with a pile hole that is a passage of air and a grouting solution;
   a screw that is formed spirally and integrally around the body;
   one or more grouting holes formed around the body so that the grouting solution can be sprayed;
   a tip expanding-reinforcing plate that has a plate shape, is coupled to one end of the body on its top, and has an air discharge hole formed through the top and a bottom in the same line as the pile hole; and
   an excavation bit that has one end coupled to a side of the bottom of the tip expanding-reinforcing plate and the other end with a blade,
   wherein when the bit and the screw are configured to form a hole in the ground by rotation and the tip expanding-reinforcing plate is configured to move to the bottom of the hole to perform grounding, thereby increasing a tip support force, and
   wherein the tip expanding-reinforcing plate further includes a sub-screw integrally and spirally formed around the tip expanding-reinforcing plate.

2. The screw pile of claim 1, wherein air spray holes are formed around the body, being disposed adjacent to the tip expanding-reinforcing plate 400.

3. The screw pile of claim 2, wherein the air spray holes are declined inward from the outside.

4. The screw pile of claim 1, wherein the tip expanding-reinforcing plate has a coupling groove on the top with the air discharge hole to fit to an end of the body, and
   the end of the body is inserted in the coupling groove.

5. The screw pile of claim 1, wherein the tip expanding-reinforcing plate further has multiple soil holes formed through the top and the bottom, and
   the soil holes are configured to discharge soil cut off by the excavation bit outside.

6. The screw pile of claim 1, wherein the sub-screw is spirally formed around the tip expanding-reinforcing plate so that its one end is engaged with one end of the screw.

7. The screw pile of claim 1, further comprising another body with grouting holes that is coupled to another end of the body.

8. The screw pile of claim 1, wherein in the tip expanding-reinforcing plate, a plurality of portions of a circular plate is cut perpendicular to a longitudinal direction of the body and the plurality of cut portions are twisted to be spaced at a predetermined distance.

9. A screw pile for reinforcing the ground, comprising:
   a rod having an internal hole and grouting holes;
   a screw that is spirally formed in a longitudinal direction around the rod; and
   a head assembly that is composed of a head and bits coupled to the left and right sides of the head and is coupled to a tip of the rod,
   wherein a width of the screw and widths of the left and right sides of the head assembly are the same.

10. The screw pile of claim 9, wherein the head is integrally formed and a coupling groove coupled to the rod is formed on a side of the head.

11. The screw pile of claim 9, wherein the head is formed in a shape of a hexahedron, the bits are formed in a shape of a plate, and one side of each of the bits is coupled to the left and right sides of the head, respectively.

12. A method of manufacturing a screw pile for reinforcing the ground, the method comprising:
   manufacturing a rod and a screw;
   manufacturing a head assembly to be combined with the rod; and
   combining the rod with the head,
   wherein the manufacturing of the head assembly includes:
   forming an integrated head;
   forming a discharge hole through a center of the head;
   forming a coupling groove for coupling the rod on a side of the head; and
   welding plate-shaped bits to the left and right sides of the head, respectively.

* * * * *